Oct. 22, 1957   E. E. SWARTSWELTER ET AL   2,810,424
METHOD AND APPARATUS FOR MAKING REINFORCED PLASTIC TUBING
Filed March 20, 1953   2 Sheets-Sheet 2

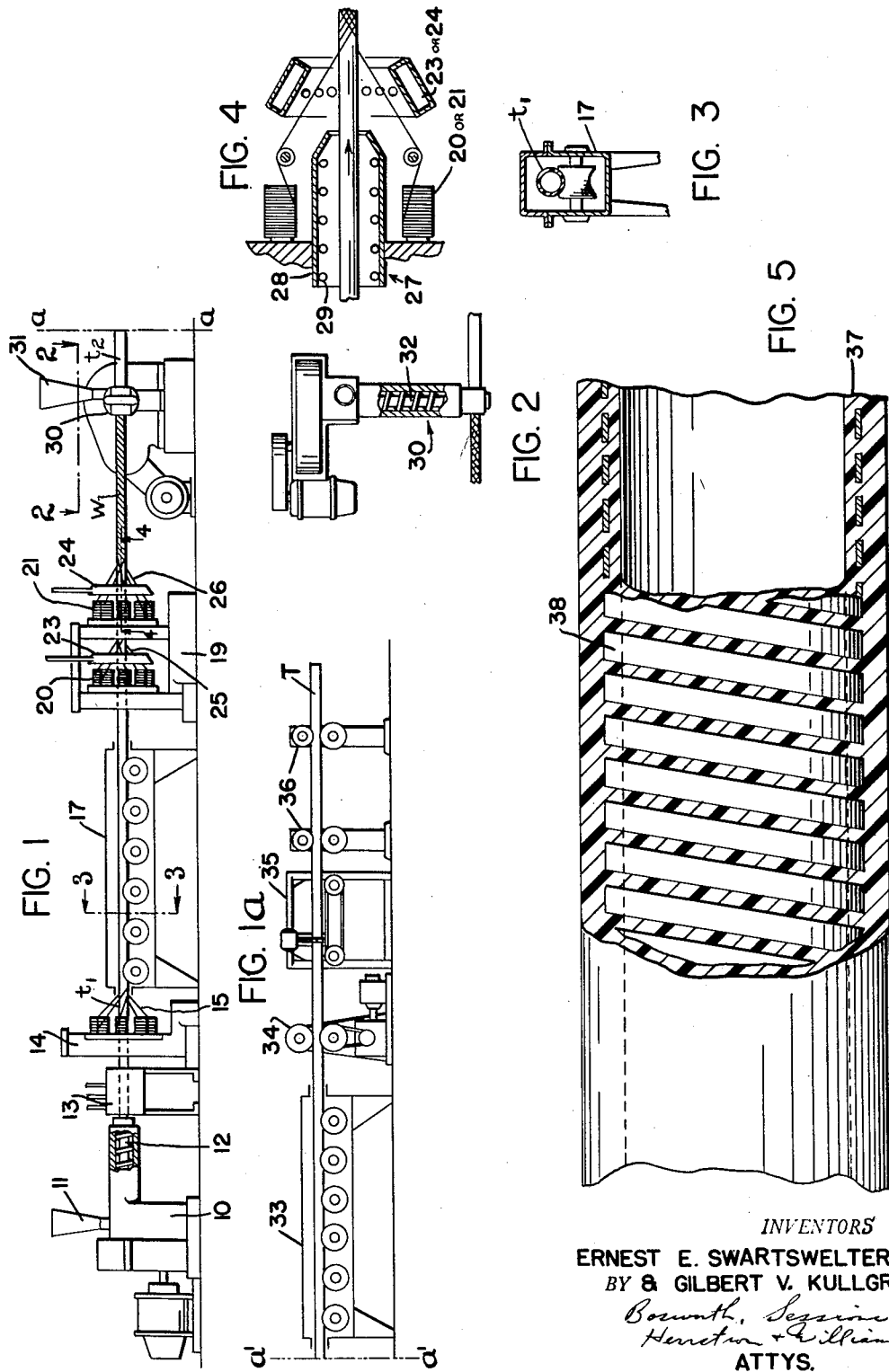

INVENTORS
ERNEST E. SWARTSWELTER
& GILBERT V. KULLGREN
BY
ATTYS.

United States Patent Office 2,810,424
Patented Oct. 22, 1957

2,810,424

METHOD AND APPARATUS FOR MAKING REINFORCED PLASTIC TUBING

Ernest E. Swartswelter, Pittsburgh, Pa., and Gilbert V. Kullgren, Akron, Ohio, assignors to The Aetna-Standard Engineering Company, Pittsburgh, Pa., a corporation of Ohio Application March 20, 1953, Serial No. 343,612

10 Claims. (Cl. 154—1.8)

This invention relates to plastic tubing and to methods and apparatus for making the same, and particularly to tubing extruded from thermoplastic materials and containing a reinforcing layer to give the tubing increased strength and resistance to bursting by internal pressure.

Plastic tubing is advantageous for many purposes because of its lightness, ease of working and handling, and resistance to corrosion and to chemicals. Heretofore, however, the use of plastic tubing has been limited because the tubing has not had sufficient strength to resist internal working pressures frequently encountered in services for which plastic tubing is ideally adapted. Also, the cost of some types of corrosion- and chemical-resistant plastic tubing has been high because of the high cost of the plastics required. According to the present invention these difficulties are overcome by providing plastic tubing made up of inner and outer tubing members bonded together with an internal circumferential reinforcement composed of a tensilely strong material such as steel or other metal in wire or strip form, or threads, cords, or tape composed of glass fibers, fibers of synthetic materials of high tensile strength such as nylon, or ordinary textile fibers such as cotton. The cost of tubing, particularly for special applications requiring chemical-resistant material is reduced not only because the reinforcement makes it possible to utilize thinner walls and smaller quantities of plastic, but also because the tubing is composed of two layers of plastic material bonded together so that the expensive chemical-resistant material needs to be employed only for the inner lining, whereas the outer portion of the tubing and main body thereof may be composed of a less expensive material. Thus, by the present invention it is possible to provide plastic tubing of comparatively high strength and having desired qualities as to corrosion and chemical resistance at a reasonable cost.

Referring now to the drawings:

Figures 1 and 1a together illustrate somewhat diagrammatically a preferred form of apparatus for making plastic tubing.

Figure 2 is a section as indicated by line 2—2 of Figure 1.

Figure 3 is a section as indicated by line 3—3 of Figure 1.

Figure 4 is a fragmentary longitudinal section as indicated by line 4—4 of Figure 1.

Figure 5 is a longitudinal view, partially in section, illustrating one form of tubing that can be made on our apparatus.

The apparatus for producing tubing according to the present invention is made up of well known components and as shown in Figure 1, the first instrumentality is an extruder 10, which may be of standard construction and which is arranged to extrude plastic material placed in the hopper 11; the material is heated to the desired temperature and extruded by a screw 12, the material being forced out of a die or nozzle and over a mandrel in the usual manner to provide the inner tubular member $t_1$.

Figure 6:
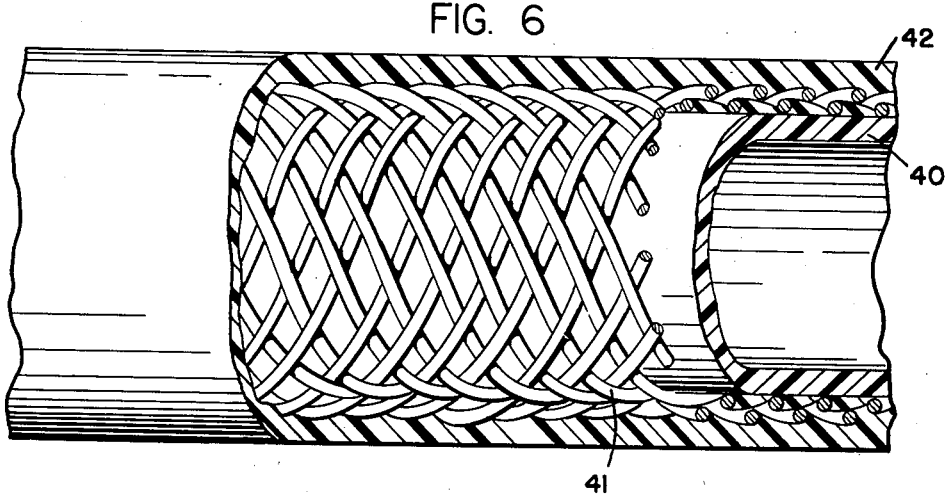
Figures 6 and 7 are similar views illustrating other forms of tubing that can be made according to the apparatus and method of the present invention.
Figure 7:
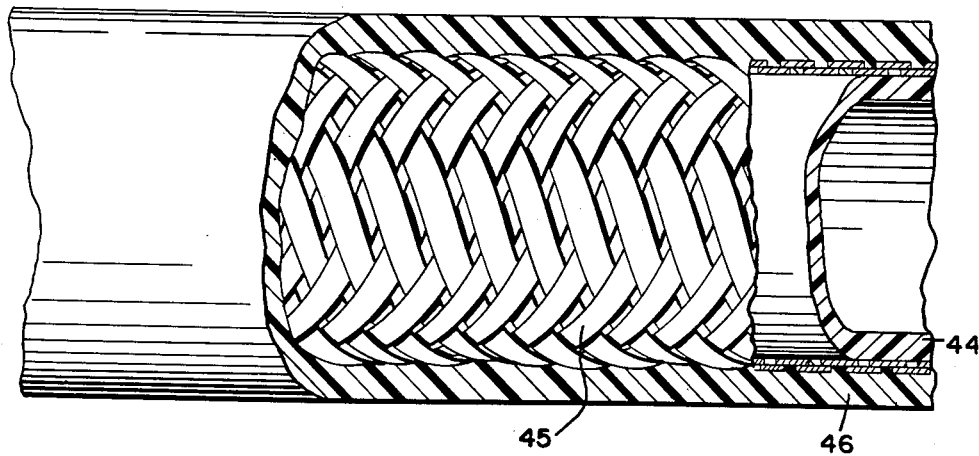

From the extruder 10, the tubing passes through exterior sizing rings indicated at 13 which may be used optionally to bring the exterior of the tubing accurately to size. Immediately following the sizing rings 13, a braider 14 is provided. This also may be of conventional construction and is adapted to wind or braid one or more generally circumferentially extending strands 15 of elongated reinforcing material on the exterior of the tubing extruded by the extruder 10. The braider 14 is positioned close to the extruder, with only the sizing rings intervening, so that, if desired, the wrapping operation can be carried out while the plastic material forming the inner tube $t_1$ is still in a somewhat softened condition; under these conditions the tension members wound or braided on the exterior of the inner tube $t_1$ at least partially embed themselves into the wall of the tube. The amount of embedding can be governed by controlling the tension applied during winding and by the plasticity of the material. The tension members are spaced in the winding operation to provide a circumferential wrapping with openings therethrough as indicated in Figures 5, 6 and 7 so that the plastic material can flow through the wrapping, making it possible to bond the subsequently applied outer tubing member to the inner tubing member through the interstices or openings in the wrapping.

Following the braider, the tubing travels through a conditioner 17, a sectional view of the tubing $t_1$ in the conditioner being shown in Figure 3. Here the tubing is cooled and hardened to a greater extent.

From the conditioner 17 the tubing passes through a double braider indicated in general at 19 and having two braiding heads 20 and 21; with this machine either one or two spiral layers of reinforcement can be wound on the tubing or a single or double braid produced. Each of the braiding heads 20 and 21 are provided with heating manifolds 23 and 24 so that if desired heat can be applied to pre-heat the reinforcing strands 25 and 26 or either group of them before they are applied to the exterior of the thermoplastic material making up the inner tube $t_1$. Also, as shown particularly in Figure 4, an electric heating element 27 comprising a tubular support 28 and heating elements 29 may be associated with either or both braiding heads 20 and 21 to heat the surface of the exterior of the tube $t_1$ and soften the same so as to make it possible more readily to embed the reinforcing strands 25 and 26 therein and to bond the strands to the material of the tube.

It is to be understood that only one of the braiding heads 23 or 24 may be utilized if it is desired to apply only a single braid or winding. Furthermore, the braider 19 ordinarily will not be used if a wrapping or reinforcement is applied by the braider 14. If the braider 14 remains idle then either or both heads of the braider 19 will be used and in some instances it may be desirable to utilize both the braider 14 and one or both heads of the braider 19. The two separate braiders are provided primarily to give flexibility of operation and to provide for applying the reinforcing material at different stages in the manufacture of the tubing. Thus, by using braider 14, the wrapping can be embedded substantially entirely in the inner tube $t_1$. The amount of embedding can be varied to the other extreme, wherein the tube $t_1$ is permitted to harden substantially completely; under such conditions a wrapping can be applied by braider 19 that will be embedded only slightly, if at all, in the exterior of inner tube $t_1$; such a wrapping can be utilized to pre-stress the inner tube $t_1$, and is penetrated by the subsequently applied outer tube member $t_2$. On the other hand, by using the heating element or element 27, and/or heating the reinforcing strands 25 and 26, the wrapping applied by braider 19 can be embedded to substantially any desired degree in the tubing.

After the tubing with one or more layers of reinforcement thereon leaves the braider 19, it passes through the crosshead extruder 30. In this extruder, the hopper 31 supplies material to the screw 32 (Figure 2) which extrudes a tubular layer of heated plastic around the previously formed inner tube $t_1$ as the previously formed tube $t_1$ with a wrapping or reinforcement W thereon passes through the die orifice of the extruder. In this extruder, which also is of a well known type, the screw extends at right angles to the path of travel of the tube as distinguished from the longitudinal disposition of the screw in the extruder 10.

The tubing, which now has an outer layer of plastic covering the reinforcing material, passes through a second conditioner 33 which may be constructed substantially the same as conditioner 17 and in which the tubing is cooled and permitted to solidify, then it passes through a pair of driven capstan rolls 34 which function to draw the tubing through the apparatus. Next the tubing is cut into convenient lengths by a flying saw 35 and the individual pieces are conveyed by stands 36 of conveyor rolls to a run-out table, transverse conveyor, storage bin, or the like (not shown).

It will be evident that with the two extruders and two braiders great flexibility of operation can be obtained and that various kinds and types of tubing can be produced by varying the materials used both in the plastics and in the reinforcement and by varying the mode of operation of the braiders in relation to the rest of the apparatus. A simple form of tubing embodying the present invention is illustrated in Figure 5. This comprises a tubing wall 37 of plastic that is homogeneous throughout except for the spirally wound reinforcement 38. Tubing of this character may be made by extruding a plastic inner tube member by means of extruder 10, applying the reinforcing wrapping 38 thereon by means of either braider 14 or braider 19 and then extruding another plastic tube on the exterior of the first plastic tube and wrapping by means of the crosshead extruder 30. In the tubing illustrated in the drawing the same plastic is utilized in both extruders 10 and 30. The wrapping can be initially embedded entirely or partially or not at all in the inner tubular member produced by extruder 10. In any event, the extrusion of the hot plastic by extruder 30 over the previously formed tube of the same plastic produces a homogeneous tube with the plastic layers produced by the two extruders bonded together and surrounding the reinforcing wrapping.

Various plastics may be utilized in making tubing of this character such as polyethylene, polyvinyl chloride, polystyrene, cellulose acetate butyrate, vinyl-vinylidene chloride polymers and acrylonitriles. The reinforcing material may be flat metal, as shown, round wires, or wires of other shapes. Also, as noted above, the reinforcement can be composed of fiber glass thread, cord or tape, or similar materials consisting of synthetic or natural textile fibers.

Another form of tubing that can be made on the apparatus is illustrated in Figure 6. Here the tubing consists of an inner layer or tube 40 on which a braided reinforcement 41 composed of round wire or strands has been applied by means of braider 19. It will be noted that in this instance the reinforcement has not substantially embedded itself in the inner tube 40 inasmuch as it was applied after the tube had been cooled by passing through the conditioner 17. However, in this form of tubing, the outer layer 42 applied by the crosshead extruder 30 penetrates the braided reinforcement and becomes firmly bonded to the inner tube 40 at their meeting surfaces. In this type of construction the inner layer 40 can be relatively thin, as shown, and may be composed of an expensive, corrosion-resistant plastic such as, for example, a vinyl-vinylidene chloride polymer, while the outer layer may be made up of a material such as, for example, cellulose acetate butyrate, which is less expensive and is particularly resistant to the corrosive effects of salt water or corrosive conditions in the soil. The braided reinforcement can be made of any of the materials mentioned above and it is to be understood that the particular plastics mentioned are given only by way of example. It will also be understood that, if desired, the same plastic can be used in both extruders with this type of reinforcement.

The tubing shown in Figure 7 is generally similar to that shown in Figure 6, except that the inner tubing layer 44 is reinforced by a double braid 45 composed of flat strips or tapes, this braid also being applied by the braider 19. The whole is protected by an outer tube 46. In the embodiment shown, the wrapping is embedded substantially equally in the inner and outer tubes 44 and 46. This can be accomplished either by using the braider 14 and one head of the braider 19, or by heating the tubing by heater 27 and applying both layers of the double braid by braider 19. This tubing may be constructed of any of the plastic and reinforcing materials heretofore disclosed.

From the foregoing it will be evident that we have provided an apparatus and method of making plastic tubing which may be adapted to the production of plastic tubing of a wide variety of compositions and characteristics. Because of its internal reinforcement, our plastic tubing is resistant to internal pressure. Because of its two-layer construction, our tubing can be made of plastic most suitable for the internal and external influences to which it may be subject. The reinforcing material is protected on both the interior and exterior and hence need not be resistant to corrosion or chemicals. The tubing lends itself to economical manufacture of a wide variety of materials which can be selected to be the most advantageous for the particular services for which the tubing is intended. The apparatus and method are flexible and may be adapted readily to the production of various types of tubing of various materials and combinations of materials.

We claim:

1. The method of making thermoplastic tubing which includes the steps of continuously extruding heated thermoplastic material to provide an inner tubular member, continuously forming a wrapping on said inner tubular member comprising narrow reinforcing tension members spaced to provide openings through the wrapping, and continuously extruding heated thermoplastic material around said wrapped inner member to provide an outer tubular member with the material of said outer tubular member making immediate direct contact with and being bonded to said inner tubular member throughout substantially the entire area of the openings in said wrapping.

2. The method according to claim 1 wherein the wrapping is composed of a single tension member in the form of a helix with closely spaced turns.

3. The method according to claim 1 wherein the wrapping is composed of braided tension members.

4. The method according to claim 1 wherein the inner tubular member is composed of one thermoplastic material and the outer tubular member is composed of another thermoplastic material.

5. The method of making thermoplastic tubing which includes the steps of continuously extruding heated thermoplastic material to provide an inner tubular member, wrapping said inner tubular member with at least one elongated reinforcing tension member, there being openings through the wrapping so produced, carrying out said wrapping operation while the inner tubular member is at an elevated temperature and in a softened condition whereby the wrapping is at least partially embedded in the outer surface of said inner tubular member, and continuously extruding heated thermoplastic material around said wrapped inner member and into immediate direct contact therewith to provide an outer tubular member in contact with and bonded to said inner tubular member throughout substantially the entire area of the openings in said wrapping.

6. The method according to claim 5 wherein the wrapping operation is carried out before the inner member has entirely hardened after the extrusion thereof.

7. The method according to claim 5 wherein the inner member is cooled and permitted to harden and then the exterior surface thereof is reheated prior to the wrapping operation.

8. The method according to claim 5 wherein the reinforcing wrapping is substantially entirely embedded in the outer surface of the inner tubular member.

9. Apparatus for making plastic tubing comprising an extruder embodying means for heating thermoplastic material and means for continuously extruding an inner tubular thermosplastic member in a heated state, a braider immediately following the extruder for applying a circumferential wrapping to the exterior of the inner tubular member while said member is still heated and soft and another extruder following the braider for applying an outer tubular member over the wrapped inner member and in contact therewith.

10. Apparatus for making plastic tubing comprising an extruder for continuously extruding an inner tubular member, a first braider immediately following the extruder, a conditioner for cooling said inner tubular member following said first braider, a second braider following said conditioner, said second braider having two braiding heads and being equipped with tube heating means adjacent each head, both said braiders being adapted to apply reinforcing wrapping to the exterior of the inner tubular member, and a crosshead extruder following said second braider for applying an outer tubular member over the wrapped inner member and in contact therewith.

References Cited in the file of this patent
UNITED STATES PATENTS

| | | |
|---|---|---|
| 1,068,491 | Eynon | July 29, 1913 |
| 1,500,797 | Cadden | July 8, 1924 |
| 2,262,514 | Pape | Nov. 11, 1941 |
| 2,321,064 | Broedling | June 8, 1943 |
| 2,513,106 | Pendergast | June 27, 1950 |
| 2,564,602 | Hurst | Aug. 14, 1951 |
| 2,611,721 | Brees | Sept. 23, 1952 |
| 2,641,300 | Martin et al. | June 9, 1953 |
| 2,642,898 | Acock et al. | June 23, 1953 |
| 2,652,093 | Burton | Sept. 15, 1953 |
| 2,685,118 | Hunter | Aug. 3, 1954 |
| 2,690,769 | Brown | Oct. 5, 1954 |
| 2,713,885 | McKinley | July 26, 1955 |